(12) United States Patent
Shimizu et al.

(10) Patent No.: US 8,485,306 B2
(45) Date of Patent: Jul. 16, 2013

(54) ELECTRIC POWER STEERING APPARATUS

(75) Inventors: Tetsuro Shimizu, Komaki (JP); Takashi Gotou, Konan (JP); Hideki Tanaka, Toki (JP); Hiroki Masuda, Kani (JP); Tatsunori Harao, Kani (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 13/418,600

(22) Filed: Mar. 13, 2012

(65) Prior Publication Data

US 2012/0241245 A1    Sep. 27, 2012

(30) Foreign Application Priority Data

Mar. 22, 2011  (JP) .................................. 2011-62714

(51) Int. Cl.
 *B62D 5/04* (2006.01)
(52) U.S. Cl.
 USPC .......................................................... 180/444
(58) Field of Classification Search
 USPC .......................................................... 180/444
 See application file for complete search history.

(56) References Cited

U.S. PATENT DOCUMENTS

| 2009/0250287 A1 | 10/2009 | Takashima et al. |
| 2009/0295325 A1 | 12/2009 | Sekine et al. |
| 2010/0314192 A1 | 12/2010 | Nagase et al. |

FOREIGN PATENT DOCUMENTS

| EP | 2006185 A2 | 12/2008 |
| EP | 2251242 A1 | 11/2010 |
| JP | 2011031755 A | 2/2011 |

OTHER PUBLICATIONS

Extended European Search Report corresponding to EP 12158412.2, dated Sep. 21, 2012.

*Primary Examiner* — Tashiana Adams
(74) *Attorney, Agent, or Firm* — Lowe Hauptman Ham & Berner, LLP

(57) ABSTRACT

An electric power steering apparatus for assisting steering of a steered wheel. The electric power steering apparatus includes an electric motor with a built-in controller for controlling rotation, a transmission mechanism for transmitting the rotation of the electric motor to the steering shaft, a connector used to pull out wiring from the controller to the outside, a first casing in which the connector and the electric motor are to be mounted and which includes an work hole used for a wire connection operation of the controller and the connector, a lid member for closing the work hole, and a second casing to be fixed to the first casing while housing the transmission mechanism. The second casing including a cover part for covering the lid member in a state fixed to the first casing.

4 Claims, 6 Drawing Sheets

ELECTRIC POWER STEERING APPARATUS

RELATED APPLICATIONS

The present application is based on, and claims priority from, Japanese Application Number 2011-62714, filed Mar. 22, 2011, the disclosure of which is hereby incorporated by reference herein in its entirety.

FIELD OF THE INVENTION

The present invention relates to an electric power steering apparatus for vehicle.

BACKGROUND OF THE INVENTION

An electric power steering apparatus for assisting a steering wheel operation utilizing a rotational force of an electric motor is known as a power steering apparatus for assisting a steering wheel operation performed by a driver.

JP2001-31755A discloses an electric power steering apparatus with a motor unit in which a control board and a power device board are integrally provided to an electric motor.

SUMMARY OF THE INVENTION

In the case of using a control board integrated electric motor in which a control board is integrally provided, a connector used to take wiring out to the outside and the control board need to be connected by wire in mounting the electric motor in a casing. Thus, a work hole used to connect the control board and the connector by wire is formed in the casing in some cases. In the case of forming the work hole in the casing, a lid member needs to be mounted in the work hole to close the work hole.

The present invention aims to reliably mount a lid member for closing a work hole used for wire connection of a connector in the case of using a controller integrated electric motor.

To achieve the object described above, this invention provides an electric power steering apparatus for assisting steering of a steered wheel. The electric power steering apparatus includes an electric motor with a built-in controller for controlling rotation, a transmission mechanism for transmitting the rotation of the electric motor to the steering shaft, a connector used to pull out wiring from the controller to the outside, a first casing in which the connector and the electric motor are to be mounted and which includes an work hole used for a wire connection operation of the controller and the connector, a lid member for closing the work hole, and a second casing to be fixed to the first casing while housing the transmission mechanism. The second casing including a cover part for covering the lid member in a state fixed to the first casing.

The details as well as other features and advantages of this invention are set forth in the remainder of the specification and are shown in the accompanying drawings.

DESCRIPTION OF THE PREFERRED EMBODIMENTS

Figure 1:
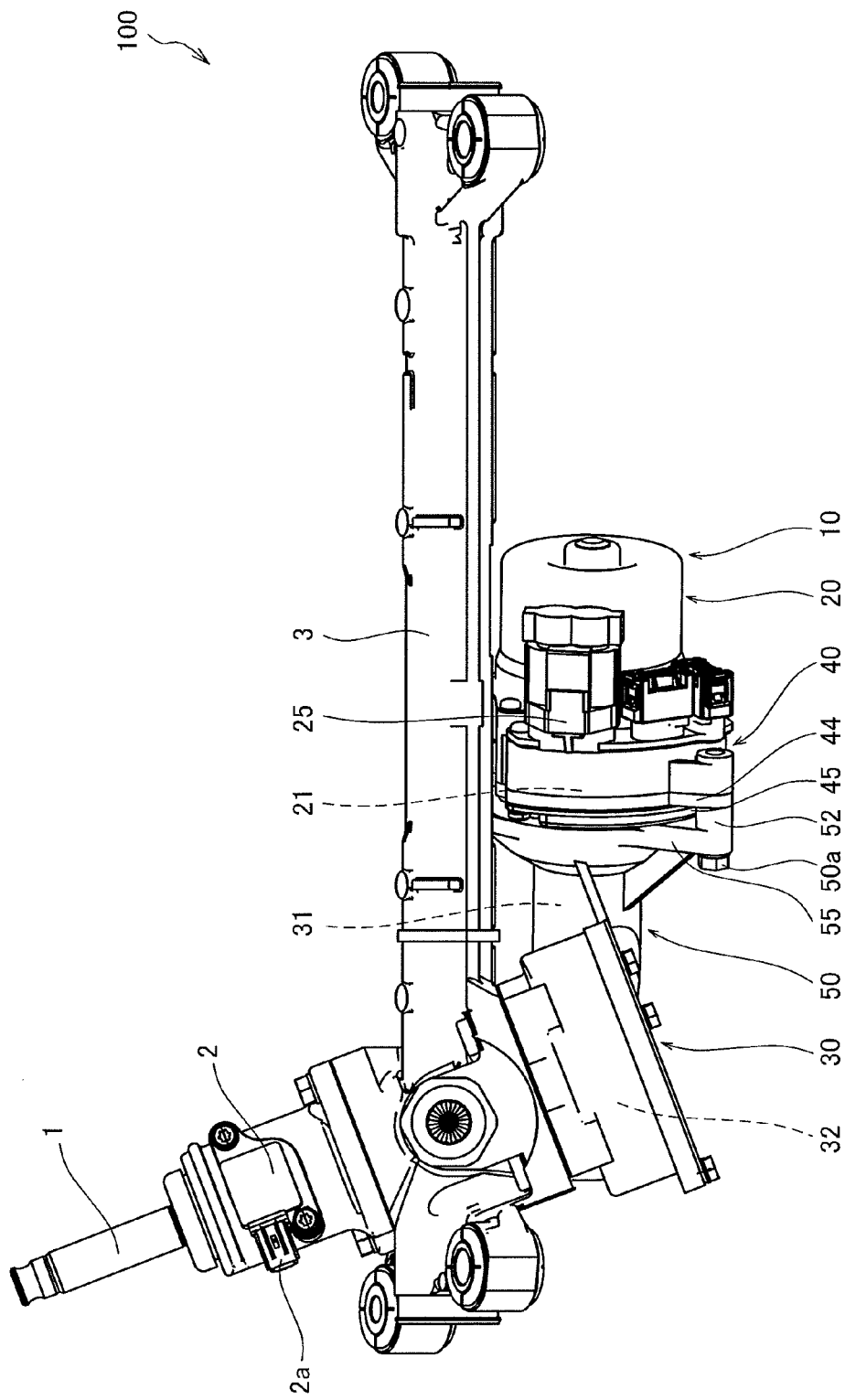
FIG. 1 is a front view of an electric power steering apparatus according to an embodiment of the present invention.
Figure 2:
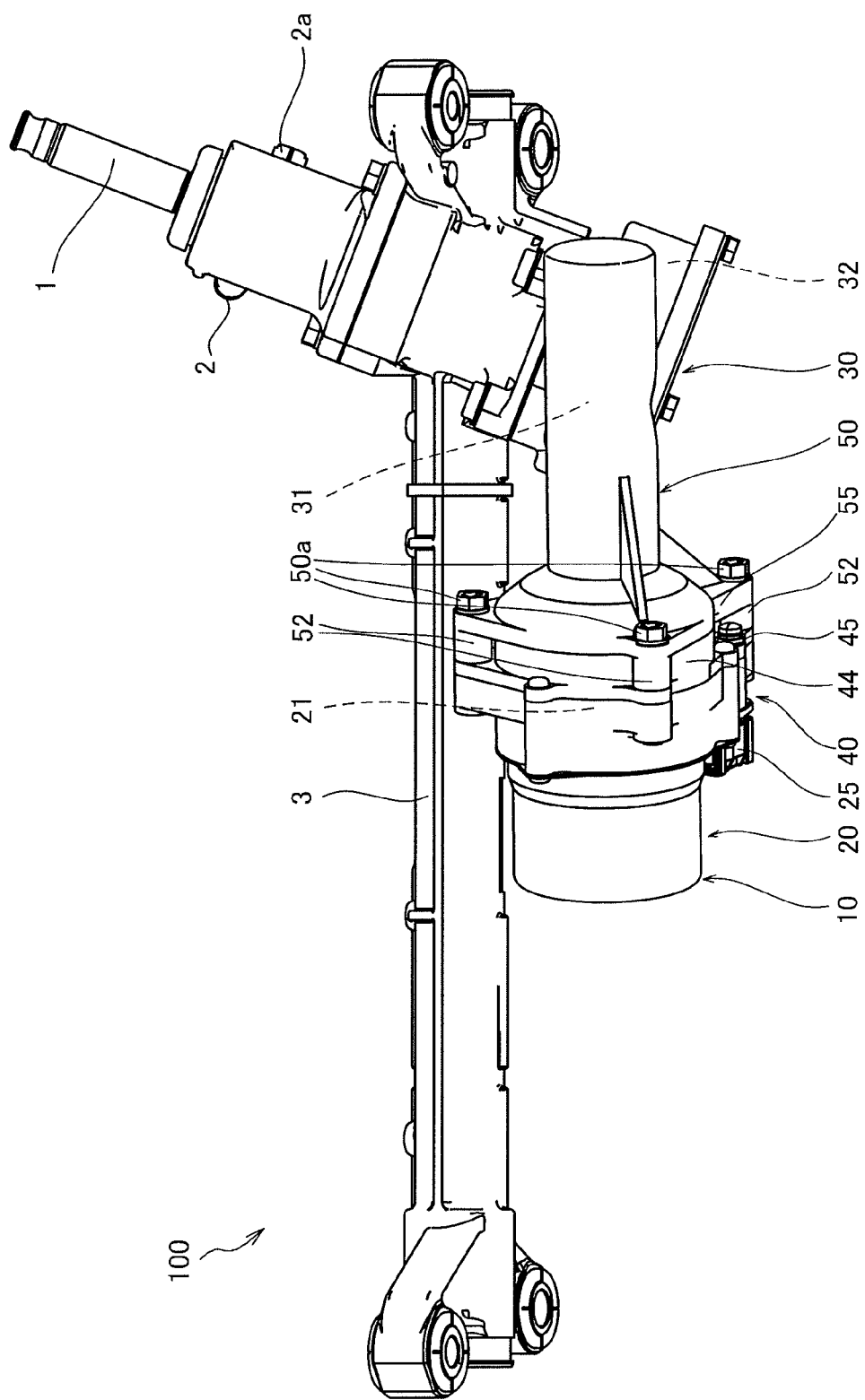
FIG. 2 is a rear view of the electric power steering apparatus of FIG. 1.
Figure 3:
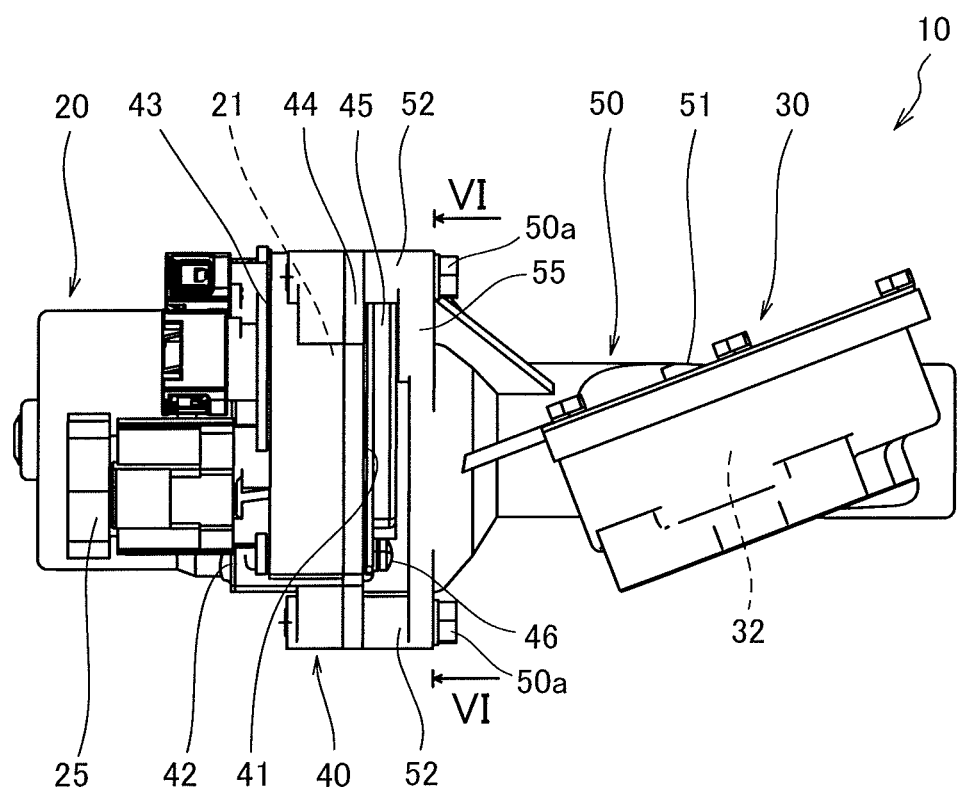
FIG. 3 is a front view of an assist unit in the electric power steering apparatus.
Figure 4:
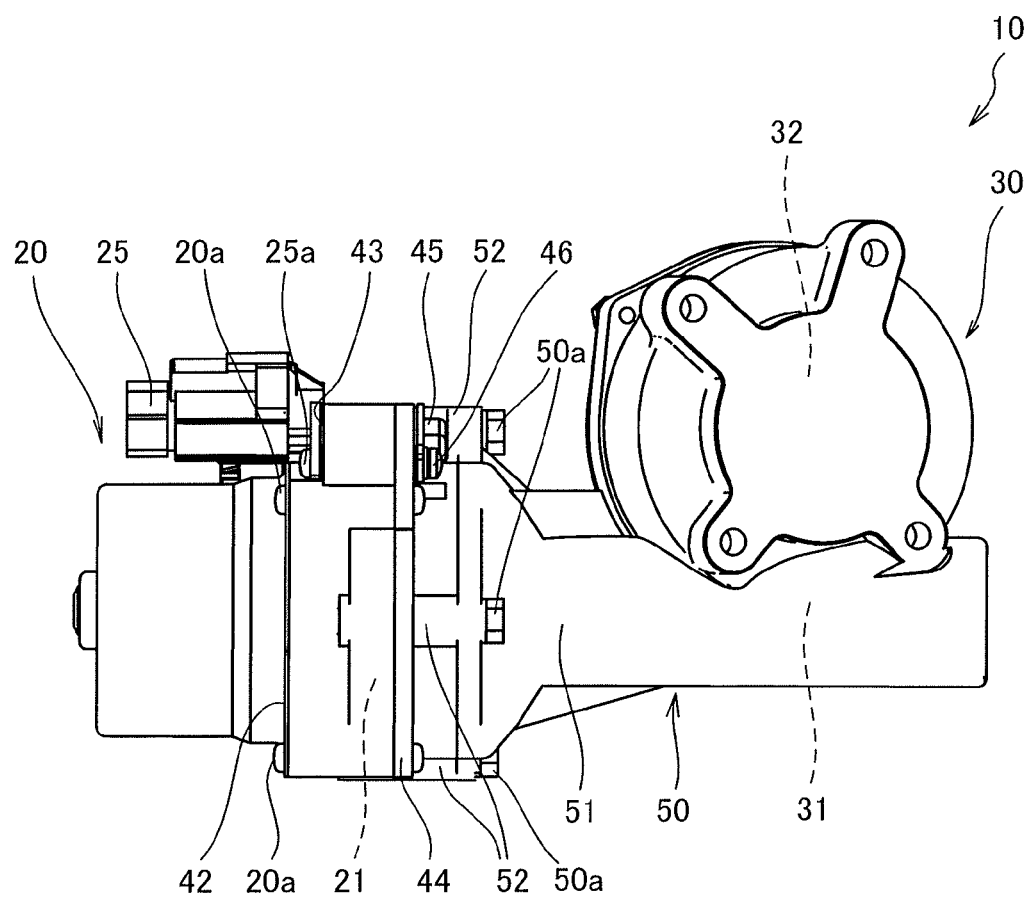
FIG. 4 is a bottom view of the assist unit of FIG. 3.
Figure 5:
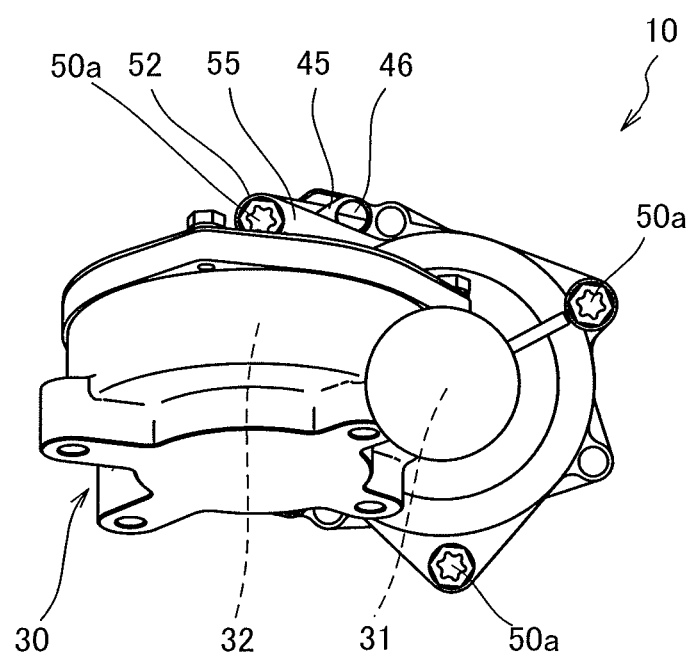
FIG. 5 is a right side view of the assist unit of FIG. 3.
Figure 6:
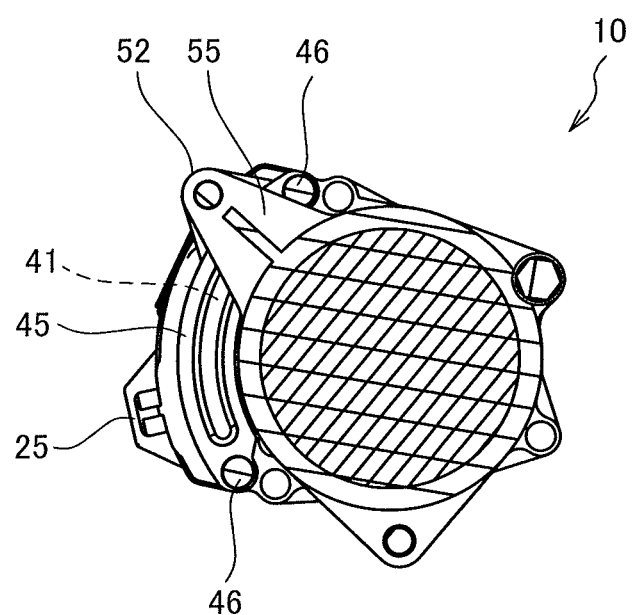
FIG. 6 is a sectional view of the assist unit cut along VI-VI line of FIG. 3.

The entire construction of an electric power steering apparatus 100 according to an embodiment of the present invention is described with reference to FIGS. 1 and 2.

The electric power steering apparatus 100 is installed in a vehicle to assist a steering wheel operation performed by a driver.

The electric power steering apparatus 100 includes a steering input shaft 1 to which a torque resulting from a steering wheel operation by the driver is input, an unillustrated steering output shaft coaxially coupled to the steering input shaft 1 via an unillustrated torsion bar and linked with wheels, a torque sensor 2 for detecting a torque acting on the torsion bar, and an assist unit 10 for giving an assist force corresponding to an output of the torque sensor 2 to the steering output shaft.

The steering input shaft 1 is a tubular shaft, one end of which is coupled to an unillustrated steering wheel at a driver's seat. The torsion bar for detecting a torque is inserted into the inner periphery of the other end of the steering input shaft 1.

The torsion bar has one end fixed to the steering input shaft 1 and synchronously rotates with the steering input shaft 1. The other end of the torsion bar is press-fitted into one end of the steering output shaft. In this way, the steering output shaft is coupled to the steering input shaft 1 via the torsion bar and the steering input shaft 1 and the steering output shaft are relatively rotated by a twisted amount of the torsion bar.

When being input to the steering input shaft 1, the torque resulting from the steering wheel operation by the driver is transmitted to the steering output shaft via the torsion bar. At this time, the torque sensor 2 detects the torque acting on the torsion bar based on the twisted amount of the torsion bar.

An unillustrated steering pinion to be engaged with an unillustrated rack shaft mounted movably in an axial direction in a rack casing 3 fixed to the vehicle is provided on the outer periphery of the steering output shaft. This causes the rack shaft to move in the axial direction and the steered wheel coupled to the rack shaft via an unillustrated tie rod to be steered when the steering output shaft rotates.

A worm wheel 32 of a worm speed reducer 30 to be described later is fixed to the outer periphery on the other end of the steering output shaft. This causes the steering output shaft to rotate integrally with the worm wheel 32.

The torque sensor 2 is a noncontact sensor for detecting the twisted amount of the torsion bar based on a change in magnetic field. Besides, the torque sensor 2 may be a contact sensor such as a sensor using a potentiometer. The torque sensor 2 includes a connector 2a for outputting a signal corresponding to the detected torque.

Next, the assist unit 10 is described with reference to FIGS. 3 to 6.

The assist unit 10 includes an electric motor 20 operating in correspondence with the output from the torque sensor 2, the worm speed reducer 30 as a transmission mechanism for transmitting a rotational force of the electric motor 20 to the steering output shaft while decelerating and amplifying it, and a connector 25 for taking out wiring from an ECU 21 built in the electric motor 20 to the outside. The assist unit 10 assists steering of the steered wheel by the rotational force of the electric motor 20 transmitted via the worm speed reducer 30.

Further, the assist unit 10 includes a first casing 40 with a work hole 41 used for a wire connection operation of the ECU 21 and the connector 25 in mounting the connector 25 and the electric motor 20, a lid member 45 for closing the work hole 41, and a second casing 50 in which the worm speed reducer 30 is housed and which is fixed to the first casing 40.

The electric motor 20 is driven by electricity supplied from an unillustrated power supply device of the vehicle and generates a rotational force for assisting the steering wheel operation by the driver. The rotational force of the electric motor 20 is transmitted from an output shaft of the electric motor 20 to the worm speed reducer 30.

The ECU (Electronic Control Unit) 21 as a controller for controlling the rotation is built in the electric motor 20.

The ECU 21 is composed of a microcomputer including a CPU (Central Processing Unit), a ROM (Read-Only Memory), a RAM (Random Access Memory) and an I/O interface (Input/Output interface). The RAM stores data in the processing of the CPU, the ROM stores a control program of the CPU and the like in advance, and the I/O interface is used to input and output information to and from connected devices. By operating the CPU and the RAM in accordance with the program stored in the ROM, a control of the electric power steering apparatus 100 is realized. The ECU 21 is electrically connected to the torque sensor 2. The ECU 21 controls an output of the electric motor 20 according to the torque detected by the torque sensor 2.

The connector 25 is a terminal for taking out the wiring from the ECU 21 to the outside. An unillustrated power line electrically connected to the power supply device and an unillustrated signal line electrically connected to the connector 2a of the torque sensor 2 are connected to the connector 25. By this, power is supplied to the ECU 21 and a signal from the torque sensor 2 is input thereto.

The worm speed reducer 30 transmits the rotation of the electric motor 20 to a steering shaft via the steering output shaft. The worm speed reducer 30 includes a worm 31 which rotates integrally with the output shaft of the electric motor 20, and the worm wheel 32 which is engaged with the worm 31 and outputs the rotation of the electric motor 20 while converting a rotational direction.

The worm 31 is a screw gear arranged coaxially with the output shaft of the electric motor 20. The base end of the worm 31 is fixed to the output shaft of the electric motor 20. The free end of the worm 31 is supported on the second casing 50 via an unillustrated bearing.

The worm wheel 32 is a helical gear whose central axis crosses that of the worm 31 and so arranged as to have a predetermined center distance. A drive force transmitted to the worm 31 is output while the rotational direction thereof is changed by the worm wheel 32. The worm wheel 32 has the steering output shaft press-fitted into the inner periphery thereof and integrally rotates. This enables the rotational force of the electric motor 20 to be transmitted to the steering output shaft via the worm speed reducer 30 and the steering wheel operation by the driver to be assisted.

The first casing 40 is formed to have a substantially cylindrical shape with open opposite ends in the axial direction. The first casing 40 includes a motor mounting part 42 which is open so that the electric motor 20 can be mounted, a connector mounting part 43 which is open in the same direction as the motor mounting part 42 and into which the connector 25 is to be mounted, a heat sink part 44 for radiating heat generated from the ECU 21 housed therein, and the work hole 41 formed on a side opposite to the motor mounting part 42 and the connector mounting part 43.

The motor mounting part 42 is in the form of a recess recessed in an axial direction of the first casing 40. The motor mounting part 42 is shaped in conformity with the electric motor 20. The electric motor 20 is mounted in the motor mounting part 42 and fixed by fastening screws 20a shown in FIG. 4.

The motor mounting part 42 is formed with a through hole through which the output shaft of the electric motor 20 is inserted and which penetrates in the axial direction of the first casing 40.

The connector mounting part 43 is in the form of a recess formed on the outer periphery of the same surface as the one where the motor mounting part 42 is formed. The connector 25 is mounted in the connector mounting part 43 and fixed by fastening a screw 25a shown in FIG. 4.

The connector mounting part 43 communicates with the motor mounting part 42 in the first casing 40. This enables the ECU 21 of the electric motor 20 and the connector 25 to be connected by wire.

The heat sink part 44 is formed on an end part of the first casing 40 where the work hole 41 is formed. The heat sink part 44 is made of a material with high heat radiation. Together with the through hole through which the output shaft of the electric motor 20 is inserted, the work hole 41 is formed in an end surface of the heat sink part 44 facing the second casing 50. The first casing 40 may be integrally formed to include the heat sink part 44 instead of separately forming the heat sink part 44.

The work hole 41 is an arcuate hole formed along the outer periphery of the through hole through which the output shaft of the electric motor 20 is inserted. The work hole 41 penetrates the first casing 40 in the axial direction and communicates with the connector mounting part 43. The work hole 41 is used to insert a tool by an operator for the wire connection operation of the ECU 21 of the electric motor 20 and the connector 25. The work hole 41 is open toward the second casing 50. Note that the wire connection of the ECU 21 and the connector 25 may be automatically performed using a facility instead of being manually performed by the operator.

The work hole 41 is provided only for connecting wires of the ECU 21 and the connector 25. Thus, the work hole 41 is closed by mounting the lid member 45 after the wire connection of the ECU 21 and the connector 25 is completed.

The lid member 45 is an arcuate plate having the same curvature as the work hole 41. The lid member 45 has opposite circumferential ends fastened by a pair of screws 46 and is fixed to the first casing 40. The lid member 45 is formed to be larger than the opening area of the work hole 41 and completely closes the work hole 41 in a state mounted on the first casing 40.

The second casing 50 includes a transmission mechanism housing part 51 for housing the worm speed reducer 30, a plurality of fastening parts 52 to be fastened to the first casing 40 by bolts 50a, and a cover part 55 for covering the lid member 45 in a state fixed to the first casing 40.

The transmission mechanism housing part 51 is shaped in conformity with the worm speed reducer 30 and houses the worm speed reducer 30. An opening is formed in an end surface of the transmission mechanism housing part 51 facing the first casing 40 so that the outer shaft of the electric motor 20 is insertable.

The fastening parts 52 are formed on an end part of the second casing 50 facing the first casing 40. The fastening parts 52 are formed to bulge out from the outer periphery of the transmission mechanism housing part 51. The fastening parts are substantially cylindrical bosses each formed with a through hole through which a bolt 50a for fastening the second casing 50 and the first casing 40 is inserted. The fastening parts 52 are formed at three positions on the outer periphery of the transmission mechanism housing part 51.

End surfaces of the fastening parts 52 are held in contact with the heat sink part 44 with the second casing 50 attached to the first casing 40. Thus, generated heat from the ECU 21 is transmitted to the fastening parts 52 via the heat sink part 44.

The fastening parts 52 can fix the first casing 40 and the second casing 50 by the fastened bolts 50a if being formed at two or more positions. Thus, the fastening parts 52 may be at as many positions as needed, not limited to three positions, as long as the positions are plural.

The cover part 55 is an arm formed at one of the three fastening parts 52 to straddle the lid member 45. The cover part 55 may be provided not only at one fastening part 52, but also at two or more fastening parts 52. That is, the cover part 55 only has to be provided between at least one of the fastening parts 52 and the transmission mechanism housing part 51.

The cover part 55 is held in contact with the lid member 45 and presses the lid member 45 against the first casing 40 with the second casing 50 fixed to the first casing 40. This enables the lid member 45 to be reliably mounted on the first casing 40. Further, by covering the lid member 45 by the cover part 55, collision of a flying stone or the like from the outside with the lid member 45 while the vehicle is moving can be prevented.

Generated heat from the ECU 21 is transmitted to the cover part 55 from the heat sink part 44 via the fastening parts 52 and the lid member 45. The generated heat from the ECU 21 can be radiated, since the entire surface of the cover part 55 is in contact with the air. Thus, a heat radiation area increased by providing the cover part 55 improves heat radiation of the ECU 21 can be improved.

Note that the cover part 55 may be so formed as to be separated from the lid member 45 instead of being held in contact with the lid member 45. In this case as well, the cover part 55 covers the lid member 45, wherefore the lid member 45 can be reliably mounted on the first casing 40 and collision of a flying stone or the like from the outside with the lid member 45 while the vehicle is moving can be prevented.

Further, an elastic member may be interposed in a clearance between the cover part 55 and the lid member 45. If the cover part 55 and the lid member 45 are directly in contact, the cover part 55 and the lid member 45 are required to have high dimensional accuracy. By interposing the elastic member, dimensional accuracy required for the cover part 55 and the lid member 45 is moderated.

According to the above embodiment, the following effect is achieved.

The lid member 45 for closing the work hole 41 used for wire connection of the ECU 21 of the electric motor 20 and the connector 25 is pressed against the first casing 40 by the cover part 55 of the second casing 50 with the second casing 50 fixed to the first casing 40. Therefore, the lid member 45 can be reliably mounted on the first casing 40.

Although the invention has been described above with reference to certain embodiments, the invention is not limited to the embodiments described above. Modifications and variations of the embodiments described above will occur to those skilled in the art, within the scope of the claims.

The contents of Tokugan 2011-62714, with a filing date of Mar. 22, 2011 in Japan, are hereby incorporated by reference.

The embodiments of this invention in which an exclusive property or privilege is claimed are defined as follows:

What is claimed is:

1. An electric power steering apparatus for assisting steering of a steered wheel, the electric power steering apparatus comprising:
    an electric motor with a built-in controller for controlling a rotation of the electric motor;
    a transmission mechanism for transmitting the rotation of the electric motor to a steering output shaft;
    a connector to which a wiring from the controller is connected;
    a first casing in which the connector and the electric motor are mounted and which includes a work hole for a wire connection operation of the controller and the connector;
    a lid member for closing the work hole; and
    a second casing fixed to the first casing and housing the transmission mechanism, wherein
    the connector is configured to pull out the wiring from the controller to an outside of the first casing, and
    the second casing includes a cover part for covering the lid member when the lid member is in a state of being fixed to the first casing.

2. The electric power steering apparatus according to claim 1, wherein
    the second casing includes
        a transmission mechanism housing part for housing the transmission mechanism, and
        a plurality of fastening portions fastened to the first casing, and
    the cover part includes an arm formed between at least one of the fastening portions and the transmission mechanism housing part.

3. The electric power steering apparatus according to claim 1, wherein
    the first casing includes
        a motor mounting part which is open to mount the electric motor,
        a connector mounting part which is open in the same direction as the motor mounting part to mount the connector, and
    the work hole is formed on a side opposite to the motor mounting part and the connector mounting part and open toward the second casing.

4. The electric power steering apparatus according to claim 1, wherein the cover part is held in contact with the lid member and configured to press the lid member against the first casing with the second casing fixed to the first casing.

* * * * *